United States Patent
Chikkannanavar et al.

(10) Patent No.: US 10,696,290 B2
(45) Date of Patent: Jun. 30, 2020

(54) HYBRID VEHICLE AND POWERTRAIN

(71) Applicant: Ford Global Technologies, LLC, Dearborn, MI (US)

(72) Inventors: Satish B. Chikkannanavar, Canton, MI (US); Cheng Tan, Romford (GB); Jonathan Tao, Madison Heights, MI (US); Allan Alimario, Rochester Hills, MI (US); Debborah Callicoat, Livonia, MI (US); Robert K. Taenaka, Plymouth, MI (US); Donatus Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 15/906,800

(22) Filed: Feb. 27, 2018

(65) Prior Publication Data
US 2019/0263379 A1     Aug. 29, 2019

(51) Int. Cl.
*B60W 20/13*       (2016.01)
*B60W 20/11*       (2016.01)

(52) U.S. Cl.
CPC ............ *B60W 20/13* (2016.01); *B60W 20/11* (2016.01); *B60W 2510/244* (2013.01); *B60W 2510/246* (2013.01); *B60W 2530/14* (2013.01); *B60W 2540/043* (2020.02); *B60W 2555/20* (2020.02); *B60W 2556/50* (2020.02); *B60W 2710/08* (2013.01); *Y10S 903/906* (2013.01)

(58) Field of Classification Search
CPC ................ B60W 20/13; B60W 20/11; B60W 2510/244; B60W 2510/246; B60W 2530/14; B60W 2530/28; B60W 2550/12; B60W 2550/402; B60W 2710/08; Y10S 903/906
USPC .......................................... 701/22
See application file for complete search history.

(56) References Cited

U.S. PATENT DOCUMENTS

| | | | |
|---|---|---|---|
| 6,271,648 B1 | 8/2001 | Miller | |
| 6,868,318 B1* | 3/2005 | Cawthorne | B60W 10/08 701/22 |
| 8,536,809 B2 | 9/2013 | Kojima et al. | |
| 9,340,121 B2 | 5/2016 | Schwarz et al. | |
| 9,751,423 B2 | 9/2017 | Niioka et al. | |
| 2005/0080523 A1* | 4/2005 | Bennett | B60K 6/445 701/22 |
| 2006/0028167 A1 | 2/2006 | Czubay et al. | |
| 2011/0140668 A1* | 6/2011 | Anderson | H01M 10/44 320/134 |
| 2012/0316810 A1* | 12/2012 | Syed | B60L 58/16 702/63 |

(Continued)

FOREIGN PATENT DOCUMENTS

FR      2962070 A     8/2012

*Primary Examiner* — Krishnan Ramesh
(74) *Attorney, Agent, or Firm* — David Kelly; Brooks Kushman P.C.

(57) ABSTRACT

A vehicle includes a controller that is configured to, while a battery temperature exceeds a threshold and state of charge (SOC) is above an SOC threshold, enable an electric machine to provide torque assistance at a power limit, and responsive to the temperature dropping below the threshold, increase the power limit and enable the electric machine to provide torque assistance while the SOC is above a cold SOC threshold less than the SOC threshold.

20 Claims, 4 Drawing Sheets

(56) References Cited

U.S. PATENT DOCUMENTS

| | | | |
|---|---|---|---|
| 2016/0111990 A1* | 4/2016 | Books | B60L 50/10 |
| | | | 322/23 |
| 2016/0368488 A1* | 12/2016 | Sato | B60W 10/08 |
| 2018/0264956 A1* | 9/2018 | Takagi | B60L 3/0046 |

* cited by examiner

HYBRID VEHICLE AND POWERTRAIN

TECHNICAL FIELD

The present disclosure relates to mild-hybrid vehicles having an integrated starter-generator.

BACKGROUND

The spectrum of vehicle powertrains include at one side a conventional vehicle in which propulsive power is provided by an internal combustion engine (ICE), often referred to as a conventional vehicle to the other side being a pure electric vehicle (EV) also referred to as a battery electric vehicle (BEV). In between the conventional vehicles and BEV are micro-hybrid electric vehicles (uHEVs), mild-hybrid vehicles (mHEVs), hybrid electric vehicles (HEVs), and plug-in hybrid electric vehicles (PHEVs). Micro-hybrid vehicles (uHEVs) include conventional vehicles with an ICE and a 12V battery. Mild-hybrid vehicles (MHEVs) include conventional vehicles with an integrated starter-generator (ISG) along with a 48V battery, which operates at a low-voltage as defined by SAE (e.g., a voltage less than 60V).

SUMMARY

A vehicle includes a controller that is configured to, while a battery temperature exceeds a threshold and state of charge (SOC) is above an SOC threshold, enable an electric machine to provide torque assistance at a power limit, and responsive to the temperature dropping below the threshold, increase the power limit and enable the electric machine to provide torque assistance while the SOC is above a cold SOC threshold less than the SOC threshold.

A vehicle includes a controller that is configured to, while a battery temperature exceeds a threshold and state of charge (SOC) is below an SOC threshold, enable an electric machine to charge the battery at a power limit, and responsive to the temperature dropping below the threshold, increase the power limit and enable the electric machine to charge the battery while the SOC is below a cold SOC threshold that exceeds the SOC threshold.

A method of operating an electric machine of a vehicle includes, while a battery temperature exceeds a threshold and state of charge (SOC) is above an SOC threshold, enabling an electric machine to provide torque assistance at a power limit, and responsive to the temperature dropping below the threshold, increasing the power limit and enabling the electric machine to provide torque assistance while the SOC is above a cold SOC threshold that is less than the SOC threshold.

DETAILED DESCRIPTION

Figure 1:
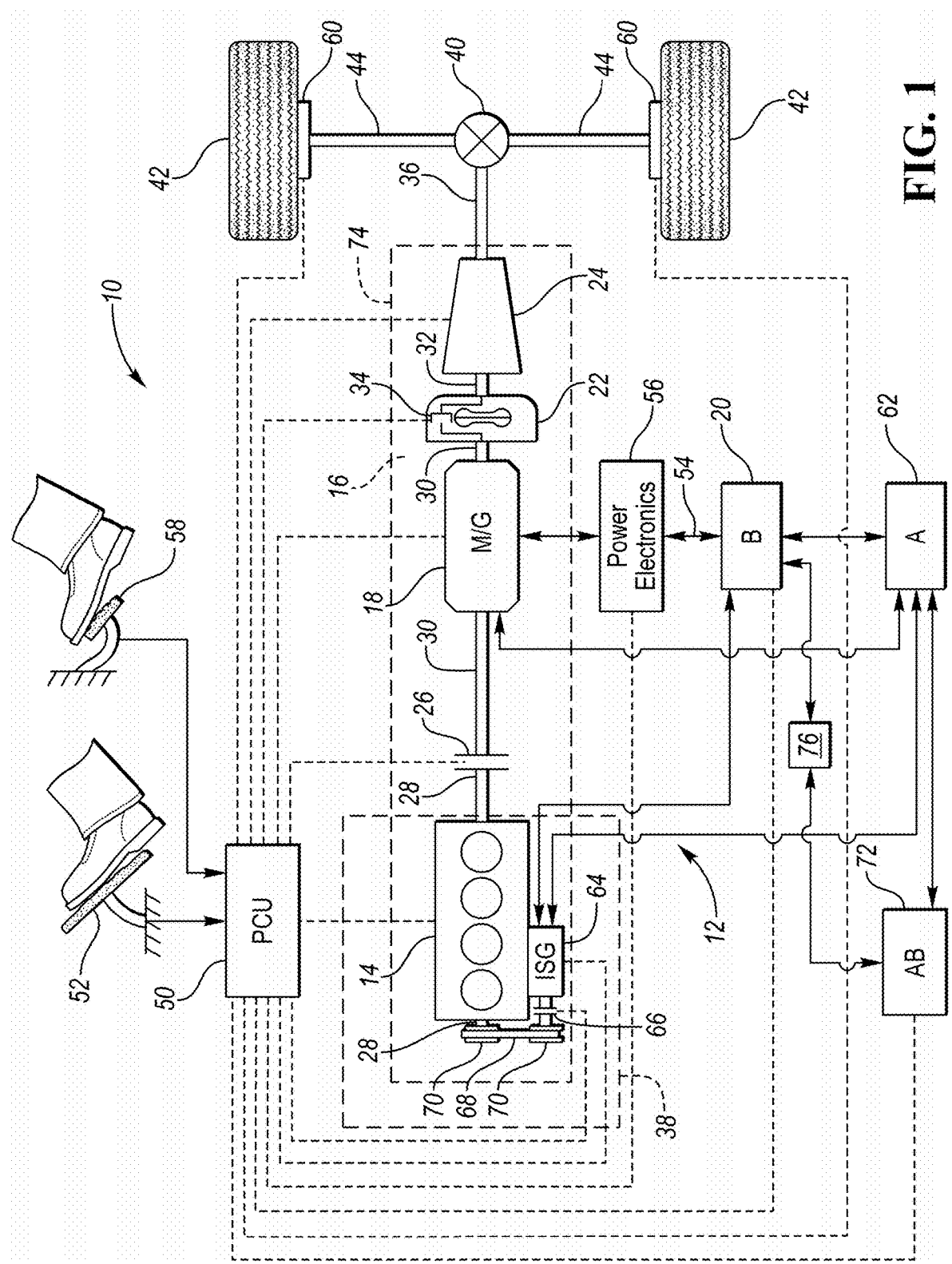
FIG. 1 is a schematic diagram of a powertrain of a mild hybrid electric vehicle (mHEV) with an integrated starter-generator (ISG).

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, Li-ion batteries operate efficiently under optimal temperatures (e.g., 30° C. to 40° C.), above the optimal temperature range the battery may experience accelerated aging (e.g., >40° C. to 80° C.) and below the optimal temperature range the battery may experience reduced energy and reduced power capability (e.g. <30° C. to 0° C.). At low temperatures their performance is reduced due to intrinsic characteristics and the physical limitations including ion diffusion, internal resistance, etc. When a Li-ion battery pack operates in cold climate condition (e.g., <5° C.), the battery power and current capability are typically reduced.

When the battery temperature is in a normal operation temperature range, (e.g., between 5° C.-45° C., or 10° C.-50° C.) generally all the mHEV power demands (e.g., Torque assist, Regeneration, DC-DC conversion, Alternator, and Engine Crank) may be supplied by the main battery (e.g., a 48V Li-ion battery). However, if the temperature drops below the range (e.g., <5° C.) the available power diminishes, therefore impeding the use of some power demands, (e.g., engine crank) support for an electric machine, such as an integrated starter generator (e.g., BISG). Therefore, a controller typically disables the electric machine (or ISG) for crank usage below 5° C. and thereby the start/stop function is disabled, which is crucial for overall vehicle performance and fuel economy. To enable cranks in cold climate conditions, efficient battery warm up has to be achieved so that battery power capability is restored to nominal level instead of being limited due to low temperature. However, a straight warm up of the battery pack from low temperatures such as −30° C. or −20° C. may be energy or power intensive. Therefore, a unique approach of battery warm-up is presented using a protocol that is based on a customer's real life usage.

Figure 2:
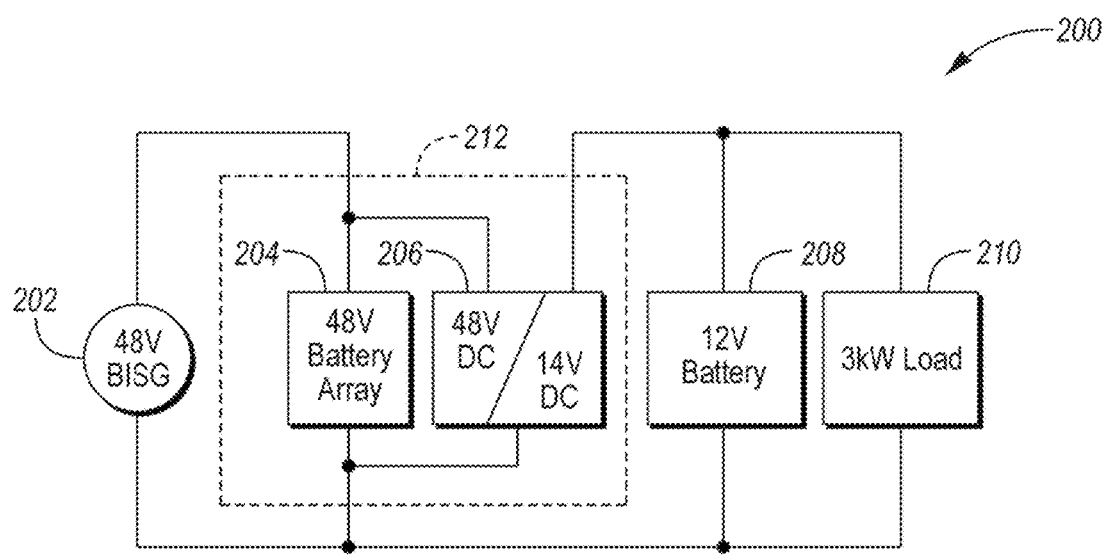
FIG. 2 is a block diagram of a power net system for a mHEV vehicle.

A micro hybrid vehicle (uHEV) typically uses a single battery, usually 12 Volts, to power a starter for the ICE and the base loads (e.g., vehicle electronics modules, infotainment, instrument cluster, body modules, safety modules, etc.) of a vehicle, while a mild hybrid vehicle (mHEV) uses another low voltage battery, such as a 48 Volt battery to power the integrated starter/generator. The 48V battery also supports the power demands for various usage events, namely, torque assist, discharge crank, regenerative breaking, DCDC loads and alternator support. FIG. 2 illustrates the 48V and 12V power nets for a mHEV vehicle.

Figure 4:
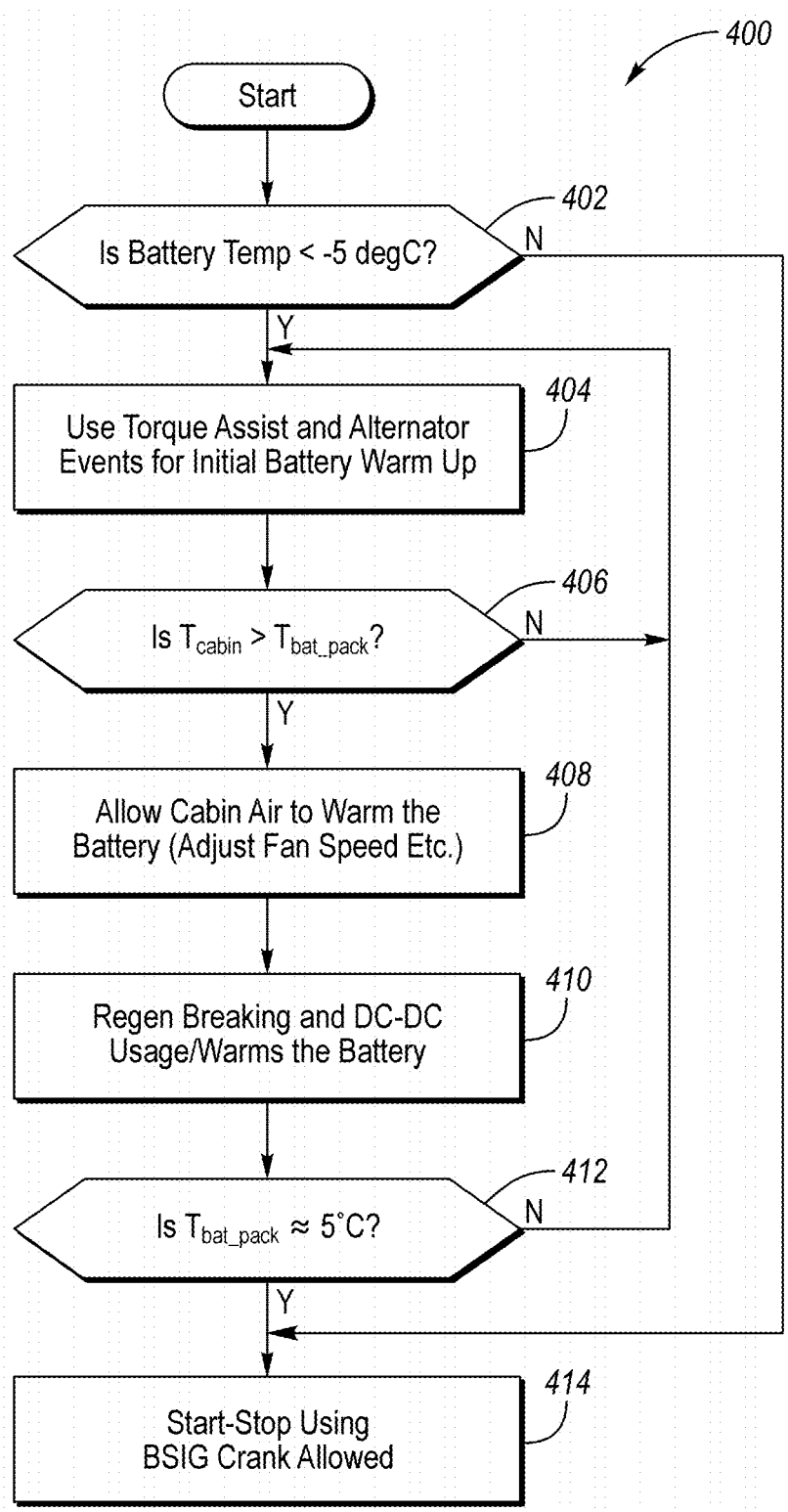
FIG. 4 is a flow diagram of a control system for warming up the 48V battery.

Here, Torque Assist and Alternator usage can be controlled, by a controller, to warm the battery pack at the begin of trip while meeting battery pack power limits at cold temperatures. Also the controller may utilize cabin air as it is warmed up in which the warm cabin air can be pumped into battery pack to warm the battery pack. With the use of Regen and DC-DC usage events by the customer during the later course of trip, a controller may predict further warm up for the battery cells and interiors of mHEV pack. The process flow chart of FIG. 4 illustrates a control strategy, which is dependent on the usage events, for warming the battery pack in the mHEV vehicle during drive routine in cold climate conditions.

Here, the battery is warmed up slowly without causing detrimental effects such as Li plating and life degradation. The various events such as Torque Assist, Alternator, DC-DC and powernet usage events can be gainfully employed along with warm cabin air to assist in battery warm up to 5° C. Following warm up to 5° C., the BISG cranks can be enabled to assist with Engine Start-Stop operations. With fuel economy being an important driver for mHEV vehicles, efficient battery warm-up and optimal usage for Start Stop function would benefit the vehicle performance and enhance drive experience for the mHEV customers.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. An example of hybridization architectures, the ISG block is integral part to the powertrain in a type P0 architecture 38, or the ISG block is located away from ICE in a type P2 architecture 74, however, other variations can be also utilized in a mHEV vehicle.

The engine 14 and the M/G 18 are both drive sources for the HEV 10 that are configured to propel the HEV 10. The engine 14 generally represents a power source that may include an internal combustion engine such as a gasoline, diesel, or natural gas-powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three-phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The disconnect clutch 26 and the M/G 18 may be disposed within a common housing or case that is located between the engine 14 and the gearbox 24. Collectively, the disconnect clutch 26, the M/G 18, and the case may be referred to as a powertrain module, or more specifically the front module.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

The transmission 16 may also include a pump (not shown) that is configured to deliver hydraulic fluid to the friction elements within the gearbox 24 and/or torque converter 22 in order to engage and disengage the various friction elements. The pump may also deliver hydraulic fluid to moving elements within the gearbox 24 and/or torque converter 22 to provide lubrication. The pump may be disposed within gearbox 24 and draw hydraulic fluid from a sump located in the gearbox 24. Fluid channels may fluidly communicate hydraulic fluid between the gearbox 24 and the front module. The fluid channels may include a delivery line that delivers hydraulic fluid from the gearbox 24 to the front module and a return line that returns hydraulic fluid to the gearbox 24 from the front module. More specifically, the fluid channels may fluidly communicate hydraulic fluid between the transmission gearbox 24 and particular components within the front module.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated. Associated with the battery 20 is a DC to DC converter 76, for conversion of voltage from 48V to 12V.

An integrated starter-generator (ISG) 64 may be coupled to the engine 14, the crankshaft 28 of the engine 14, or other drivetrain component, depending on the hybridization architecture. The ISG 64 may be configured to operate as a motor to start the engine 14 during an engine start-up or start-stop events, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

FIG. 2 is a block diagram of a power net system 200 for a mHEV vehicle. The ISG (e.g., a BISG) 202 is coupled with a converter 212 that includes a main battery 204 and a DC/DC converter 206. The main battery 204 may be a low-voltage (i.e., less than 60V) such as a 48V Li ion battery or equivalent. The DC/DC converter 206 is coupled with the main battery 204 to convert the terminal voltage of the main battery 204 to a lower terminal voltage of a secondary battery 208. The secondary battery 208 is a 12V battery, may be a lead-acid, absorbent glass mat, Li ion or other type, and is typically coupled with many vehicle loads 210 that include an infotainment system, an instrument cluster, vehicle modules, and controllers such as a powertrain controller, a transmission controller, a seat module, a liftgate module, an ignition module, and a heating, ventilation, and air conditioning (HVAC) module. Typically, the main battery 204 will have a higher capacity than the secondary battery 208.

Figure 3:
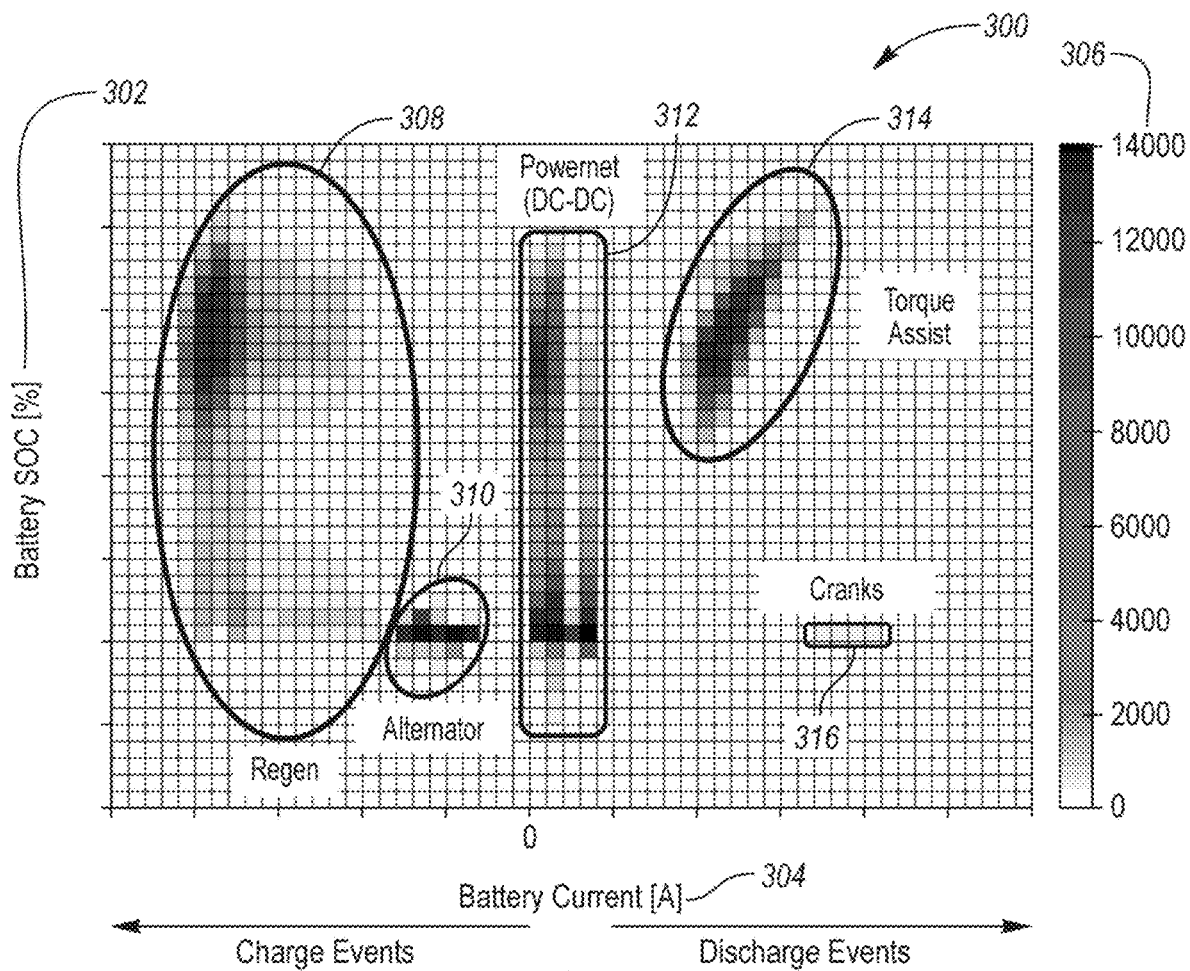
FIG. 3 is a graphical representation of a number of vehicle level power usage events occurring at a given state of charge (SOC) and a given current of the 48V battery.

FIG. 3 is a graphical representation 300 of a number of power demand events 306 at a given state of charge (SOC) 302 and a given current 304 of the battery 204. This plot 300 illustrates operating regions including a regeneration region 308, an alternator region 310, a DC-DC conversion region 312, a torque assist region 314, and a crank region 316. It is noted that the battery current 304 during a crank event 316 typically has a higher current than when the system is in a torque assistance mode 314. And the battery state of charge (SOC) 302 is typically greater during the torque assistance mode 314 than during a crank event 316. Further, the battery current 304 during a regeneration event is greater than the when the system is in an alternator mode 310. And the battery SOC 302 operates over a greater range and typically at a higher percentage during a regeneration event 308 than when in an alternator mode 310.

The adoption of a customer usage analysis statistical approach allows us to understand the level and duration of usage for various power demand events. This analysis offers a unique insight into designing a usage based protocol for events across diverse geographic and climate conditions. Consider a typical usage example in which all events responsible for power demand from the 48V battery as shown in FIG. 3. From a perspective of current demand during the customer usage, the events include Regen Events 308 which is when energy recuperation occurs. This is when the system converts the kinetic energy to electric energy to be stored in the battery (48V battery) such as regenerative braking in which a high C-rate current (e.g., 200-150 Amps/ 550-1000 Watts) flows to the battery. Next, is Alternator usage 310 in which the integrated starter/generator receives energy from the rotating (operating) ICE. This is typically a medium C-rate charge of 100-40 A or 40-250 Watts. The battery also may operate in a DC-DC mode 312 that is used to pass energy from the 48V battery to the 12V battery. This is typically a low C-rate discharge in terms of the 48V battery (e.g., 0-40 A or 0-40 Watts). Next is operating the 48V battery to provide Torque Assist Events 314 at a Medium C-rate discharge of 90-140 A or 200-600 Watts. Lastly is using the ISG to crank the ICE 316. Cranking is a high C-rate discharge of approximately 170-210 A. It should be noted that although it appears that both the alternator mode 310 and the crank mode 316 both can operate at many SOC values greater than 40%, the graphic is concentrated to approximately 45% as that is the highest occurrence of those events for this trial. Further, the discharge crank 316 usage may be inhibited below 5° C., due to the high current demand that cranking requires.

Also, customer usage events will typically either discharge or charge the 48V battery and both of which generate heat, which may be beneficial for warming up of the battery from low temperatures such as −20° C. and −30° C. An estimation for heat generated is based on a pack internal resistance at a given temperature and a given SOC. For example, at room temperature and at 50% SOC, an internal resistance may be ~25 mOhm. However, at cold temperatures, pack resistance may be higher (1-2 orders of magnitude) and accordingly may generate higher values for the heat generated due to resistive heating inside the pack. For example, a difference of heat generated may be 3-7 times greater than at room temperatures. For instance, a battery cell may have internal resistance around ~2 mΩ at room temperature, however, at −30° C. it could be as high as ~190 mΩ.

FIG. 4 is a flow diagram 400 of a control system for warming the main battery (e.g., 48V battery) in a mHEV vehicle. This flowchart 400 illustrates the use of an ISG to provide a 'torque assist' or operate in an 'alternator' mode to increase a temperature of the battery. Here, in step 402 a controller is configured to, when the battery temperature is below a cold threshold (e.g., −5° C., −7° C., or −10° C.) branch to step 404, and if the battery temperature is above the threshold, then to exit. The controller, in step 404, adjusts operation of the ISG such as selecting torque assist' and 'alternator' modes based on a state of charge (SOC) of the battery exceeds a threshold (e.g., 40%, 45%, 50%, or 60% SOC). Here, the use of 'torque assist' and 'alternator' modes include operation of the ISG during a condition of the vehicle in which the ISG is traditionally not operated (e.g., temperature, or SOC level), or operate the ISG at an operational level not traditionally operated at (e.g., at a higher power or for a longer time). The controller then branches, in step 406, based on a temperature of a cabin of the vehicle in relation to a temperature of the battery pack. If the temperature of the vehicle cabin is less than or equal to the temperature of the battery pack, the controller branches back to step 404. If the temperature of the vehicle cabin exceeds the temperature of the battery pack, the controller branches to step 408. In step 408, the controller utilizes the cabin temperature to heat the battery, for example the controller may route cabin air to the battery via operation of a fan or a louver. Further, the controller may change a fan speed based on a difference between the cabin temperature and the battery temperature (e.g., proportional to the difference or proportional to an inverse of the difference). The controller then proceeds to step 410 in which the ISG is operated by regenerative braking and DC-DC operation to warm the battery. In step 412, the controller then branches based on a temperature of the battery pack being within a range that is above the cold threshold to step 414. If the temperature is below the cold threshold, the controller branches back to step 404. In step 414, the controller adjusts the operation of the ISG, for example the controller may enable stop-start operation using the ISG.

Along with execution of the algorithm illustrated in FIG. 4, the controller may compare the energy used for the torque assist with a potential energy saving in a subsequent duration based on historical customer usage. Wherein, following operation in a 'torque assist' mode, the ISG may be configured in an 'alternator' mode to recharge the depleted mHEV battery (e.g., main battery) to warm up the main battery.

Thus, an overall effect of the customization is that mHEV battery may be warmed up to 5° C. such that the 'Start-Stop' function is enabled and the vehicle fuel economy is improved.

Figure 5:
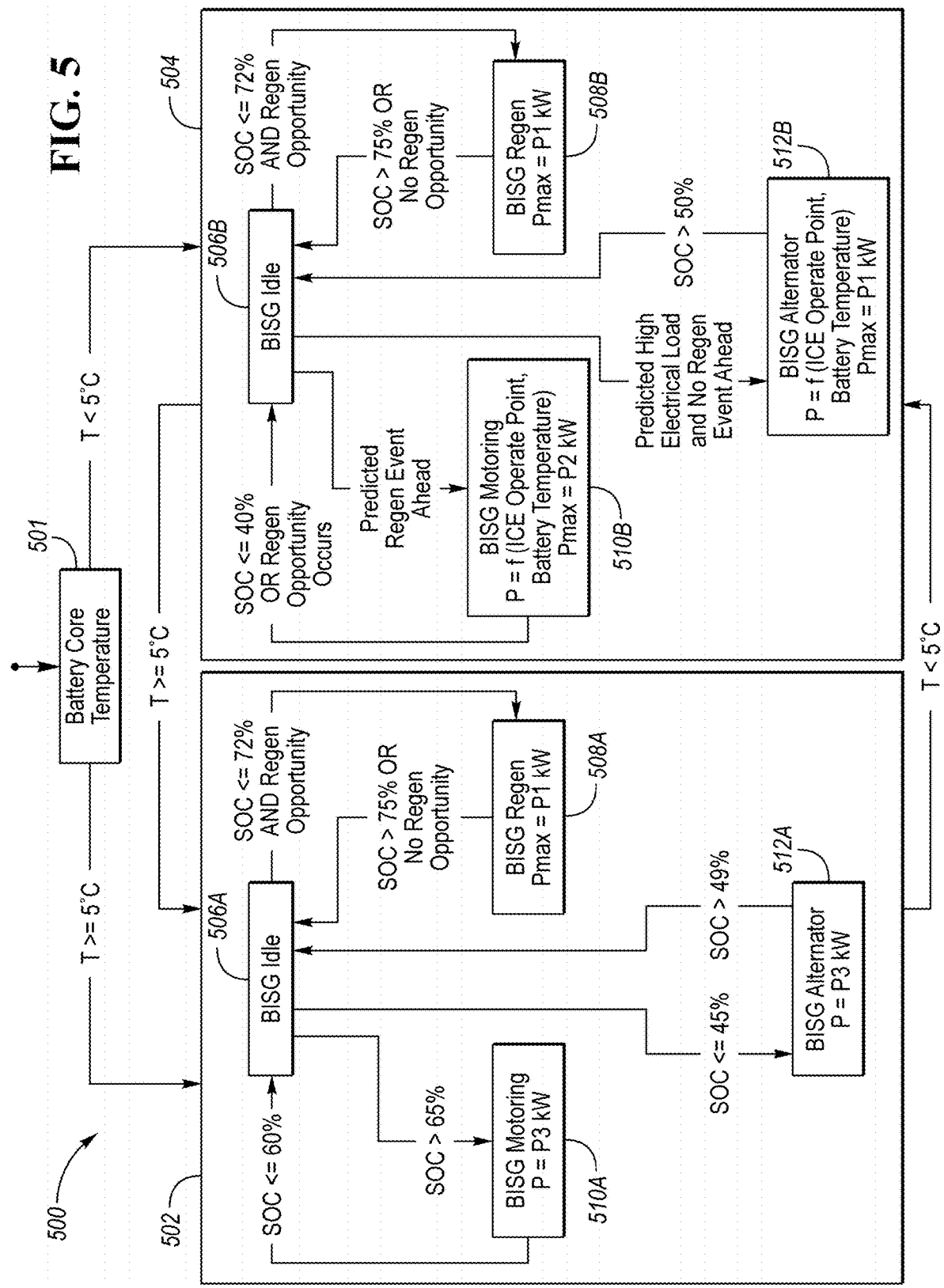
FIG. 5 is a state flow diagram of a mHEV vehicle control system during power usage events.

FIG. 5 is a state flow diagram of a BISG control system 500. Here a temperature of a main battery (e.g., ISG battery) is received by a controller in step 501. If the main battery temperature is equal to or greater than 5° C. then the controller will operate in sub-block 502, while if the main battery temperature is less than 5° C. then the controller will operate in sub-block 504. In sub-block 502, the controller operates an ISG in one of four states, an idle state 506A, an ISG regeneration state 508A, an ISG motoring state 501A and an ISG alternator state 512A. Likewise, in sub-block 504, the controller operates an ISG in one of four states, an idle state 506B, an ISG regeneration state 508B, an ISG motoring state 501B and an ISG alternator state 512B. Both of state diagram sub-blocks (502 and 504) transition between states based on operational characteristics along with battery SOC. The operational characteristics include a current power demand (e.g., power demand based on acceleration pedal position, current powertrain power output, vehicle speed, vehicle acceleration, historical powertrain usage, etc.). For example, the controller may transition from the BISG idle state 506A to the BISG regeneration state 508A based on the acceleration pedal position being a neutral (e.g., foot off the gas pedal) while the vehicle maintains a current speed or even if the vehicle continues to accelerate indicative of traveling down an incline, while the SOC of the main battery is less than a threshold. Further the controller may transition from the BISG regeneration state 508A to the BISG idle state 506A responsive to the acceleration pedal position being indicative of a power demand (e.g., foot on the gas pedal), the vehicle speed decreasing, a deceleration indicative of traveling up an incline, or an SOC of the main battery exceeding the threshold.

When the mHEV battery core temperature is low (e.g. below −5 deg C.), a BISG 'torque assist' and 'alternator' modes (battery low-current discharge and charge respectively) are available to increase heat generation inside the 48V battery. However, as during this low temperature battery condition, available current is limited, these two operational modes are confined to the battery power limits for battery durability and SOC resulting in higher global fuel economy. Here, the use the 'torque assist' and 'alternator' modes is specifically to warm-up the main battery. By warming up the main battery faster, a better fuel economy for mHEV vehicles during cold climate usage can be realized. The control of 'torque assist' or 'alternator' mode is not only determined by battery SOC, but also by the battery core temperature, operational characteristics, and customer usage.

The operation of the electric machine for torque assistance is based on a ratio of E-machine torque and ICE torque to meet the over torque demand. As the temperature decreases, the ability of the battery to provide power decreases, and typically the power requirements for the battery are also decreased. Here, as the temperature decreases below a cold temperature threshold, the power limit is increased for the torque assistance and alternator mode to the extent that, although the battery is not capable of providing increased power at the cold temperatures, the battery can still provide more power than is typically limited to during normal temperature operation. For example, the battery may be configured to provide an increased power (e.g., highest available current) at the low temperature.

Further, the ratio may be modified such that a greater percentage of torque is demanded from the electric machine at low temperatures to facilitate battery warming. The ratio change may be based on historic usage data and predictive usage data. The historic usage data includes battery current, battery SOC, and battery voltage over a period. The period includes a current drive cycle, a past drive cycle, or multiple drive cycles. The drive cycles may be further filtered based on a time of day, or day of the week, for example, Monday at 6:30 AM may correspond to a commute time to work. Also, the historic and predictive usage data may be associated with a drive profile. The driver profile may be based upon a driver seat preset selection, a key fob signal used to start the vehicle, or other driver profile selection means. The predictive usage data may include navigation data, route data, predicted traffic, predicted changes in elevation along the route, or a weather forecast. For example, if the predicted traffic is indicative of congestion, the vehicle may have more stop and go events and therefore may have more torque assistance and alternator mode events, similarly elevation changes may allow for more regenerative braking and therefore allow greater torque assistance to utilize the energy captured via regenerative braking.

The above strategy implementation achieves a faster warm up for a mHEV main battery in cold climates. The benefit of this is two-fold, first, the mHEV vehicle drivability and energy (fuel) saving is increased. For example, when the battery core temperature is low, the usage of battery power traditionally is limited, such as a 'transient assist' (BISG running in motor mode to improve the vehicle acceleration) would be hindered. Second, when the battery temperature is higher, the internal resistance of battery is lower, thereby improving the efficiency of battery usage and allowing use of more mHEV functions such as engine 'Start-Stop'. That in turn improves the fuel economy via shut-down of the engine during idling.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller configured to,
while a battery temperature exceeds a threshold and state of charge (SOC) is above an SOC threshold, enable an electric machine to provide torque assistance at a power limit, and
responsive to the battery temperature dropping below the threshold, increase the power limit and enable the electric machine to provide torque assistance while the SOC is above a cold SOC threshold that is less than the SOC threshold.

2. The vehicle of claim 1, wherein the controller is further configured to, responsive to the battery temperature dropping below the threshold increase the power limit based on historical usage data recorded over a period, wherein the historical usage data is indicative of a current flow from the electric machine to the battery and the increase in the power limit is proportional to an increase current flow.

3. The vehicle of claim 2, wherein the historical usage data is based on a driver profile and the period includes a drive cycle or multiple drive cycles, and the period is further associated with a time of day or a day of the week.

4. The vehicle of claim 3, wherein the driver profile is based on a selection of a driver seat preset or a signal received from a key fob.

5. The vehicle of claim 1, wherein the controller is further configured to, responsive to the battery temperature dropping below the threshold increase the power limit based on predicted usage data, such that the predicted usage data is captured over a period, wherein the predicted usage data is indicative of a predicted current flow from the electric machine to the battery and the increase in the power limit is proportional to an increase current flow.

6. The vehicle of claim 5, wherein the predicted usage data is based on navigation data, route data, weather, or predicted traffic data.

7. The vehicle of claim 6, wherein the predicted usage data is based on a driver profile that is based on a selection of a driver seat preset or a signal received from a key fob.

8. The vehicle of claim 1, wherein the controller is further configured to, while a battery temperature exceeds a threshold and state of charge (SOC) is below an SOC alternator threshold, enable an electric machine to charge the battery at an alternator power limit, and responsive to the battery temperature dropping below the threshold, increase the alternator power limit and enable the electric machine to charge the battery while the SOC is below a cold alternator SOC threshold that exceeds the SOC alternator threshold.

9. The vehicle of claim 1, wherein the battery is a Li-ion battery.

10. The vehicle of claim 1, wherein the controller is further configured to, divide a torque demand between a motor torque demand and engine torque demand, and responsive to the battery temperature dropping below the threshold, increase the motor torque demand relative to the engine torque demand.

11. The vehicle of claim 1, wherein the controller is further configured to, responsive to the battery temperature dropping below the threshold, inhibit operation of the electric machine to crank an internal combustion engine.

12. A vehicle comprising:
a controller configured to,
while a battery temperature exceeds a threshold and state of charge (SOC) is below an SOC threshold, enable an electric machine to charge the battery at a power limit, and
responsive to the battery temperature dropping below the threshold, increase the power limit and enable the electric machine to charge the battery while the SOC is below a cold SOC threshold that exceeds the SOC threshold.

13. The vehicle of claim 12, wherein the controller is further configured to, responsive to the battery temperature dropping below the threshold increase the power limit based on historical usage data recorded over a period, wherein the historical usage data is indicative of a current flow from the battery to the electric machine and the increase in the power limit is proportional to an increase current flow.

14. The vehicle of claim 13, wherein the historical usage data is based on a driver profile and the period includes a drive cycle or multiple drive cycles, and the time period is further associated with a time of day or a day of the week.

15. The vehicle of claim 14, wherein the driver profile is based on a selection of a driver seat preset or a signal received from a key fob.

16. A method of operating an electric machine of a vehicle comprising:

while a battery temperature exceeds a threshold and state of charge (SOC) is above an SOC threshold,
  enabling an electric machine to provide torque assistance at a power limit, and
responsive to the battery temperature dropping below the threshold,
  increasing the power limit, and
  enabling the electric machine to provide torque assistance while the SOC is above a cold SOC threshold that is less than the SOC threshold.

17. The method of claim 16 further comprising,
while a battery temperature exceeds a threshold and state of charge (SOC) is below an SOC alternator threshold,
  enable an electric machine to charge the battery at an alternator power limit, and
responsive to the battery temperature dropping below the threshold, increase the alternator power limit and enable the electric machine to charge the battery while the SOC is above a cold alternator SOC threshold that exceeds the SOC alternator threshold.

18. The method of claim 16 further comprising dividing a torque demand between a motor torque demand and engine torque demand, and responsive to the temperature dropping below the threshold, increasing the motor torque demand relative to the engine torque demand.

19. The method of claim 16 further configured to, responsive to the battery temperature dropping below the threshold, inhibiting operation of the electric machine to crank an internal combustion engine.

20. The method of claim 16 further configured to,
  capturing predicted usage data over a period; and
  responsive to the battery temperature dropping below the threshold, increasing the power limit based on predicted usage data,
  wherein the predicted usage data is indicative of a predicted current flow from the electric machine to the battery and is based on a driver profile and navigation data, route data, weather, or predicted traffic data, and
  the increase in the power limit is proportional to an increase current flow.

* * * * *